(12) United States Patent
Chau

(10) Patent No.: US 6,398,954 B2
(45) Date of Patent: Jun. 4, 2002

(54) MULTIMEDIA BACKWASHABLE FILTRATION SYSTEM

(76) Inventor: Yiu Chau Chau, 80 W. Beaver Creek Road, Unit 14, Richmond Hill, Ontario (CA), L4B 1H3

(*) Notice: Subject to any disclaimer, the term of this patent is extended or adjusted under 35 U.S.C. 154(b) by 0 days.

(21) Appl. No.: 09/808,160

(22) Filed: Mar. 13, 2001

Related U.S. Application Data

(60) Division of application No. 09/025,231, filed on Feb. 18, 1998, now Pat. No. 6,254,772, which is a continuation-in-part of application No. 09/007,497, filed on Jan. 15, 1998, now abandoned.

(51) Int. Cl.[7] ............... B01D 24/12; B01D 24/38; B01D 24/46
(52) U.S. Cl. ............ 210/278; 210/284; 210/288; 210/426; 137/625.47
(58) Field of Search ............... 210/278, 284, 210/288, 424, 425, 426; 137/625.47

(56) References Cited

U.S. PATENT DOCUMENTS

| 4,115,276 A | 9/1978 | Kelly |
| 4,196,081 A | 4/1980 | Pavia |
| 5,133,385 A | 7/1992 | Kawakami |
| 5,135,654 A | 8/1992 | Heskett |
| 5,164,082 A | 11/1992 | Lin |
| 5,242,589 A | 9/1993 | Kuo et al. |
| 5,415,770 A | 5/1995 | Heskett |
| 5,628,900 A | 5/1997 | Naito |

FOREIGN PATENT DOCUMENTS

| EP | 0 720 862 | 1/1996 |
| GB | 2 174 920 | 11/1986 |
| JP | 06-137442 A | 5/1994 |

OTHER PUBLICATIONS

"The 5600 Water Conditioning Control", undated.
"Owners Manual How to Maintain and Operate your Eco-Water Electronic Demand Water System", EcoWater Systems, St. Paul, MN, 8/95, 32 pages.
"Controls for Water Treatment", Fleck Controls, Inc., Brookfield, WI, 9/96, 8 pages.

Primary Examiner—Thomas M. Lithgow
(74) Attorney, Agent, or Firm—Cook, Alex, McFarron, Manzo, Cummings & Mehler, Ltd.

(57) ABSTRACT

A multimedia fluid treatment unit and rotatable valve are disclosed in which a plurality of discreet containers are removably stacked upon each other and contain various different and distinct water treating media. The rotatable valve is rotatable between either of three positions one of which is a service position for routing the water to be treated through the unit for treatment, a second of which is a rinse position for rinsing the media in the unit, and a third of which is a backwash position for backwashing and/or regenerating the media.

16 Claims, 3 Drawing Sheets

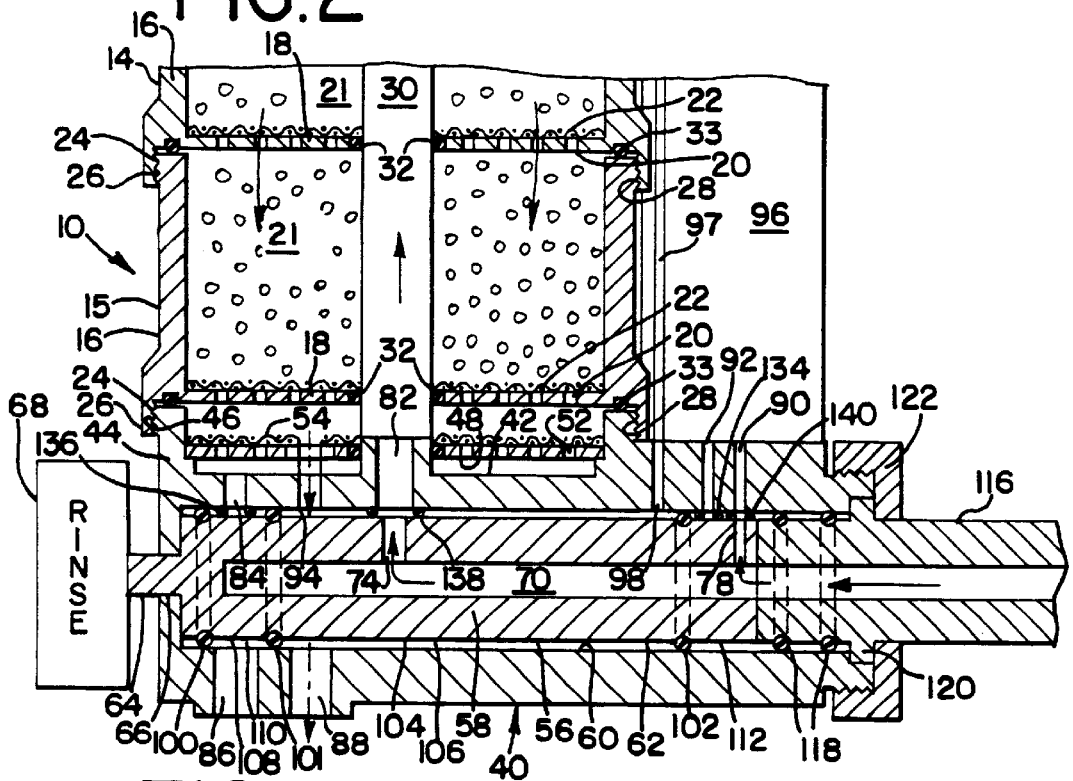
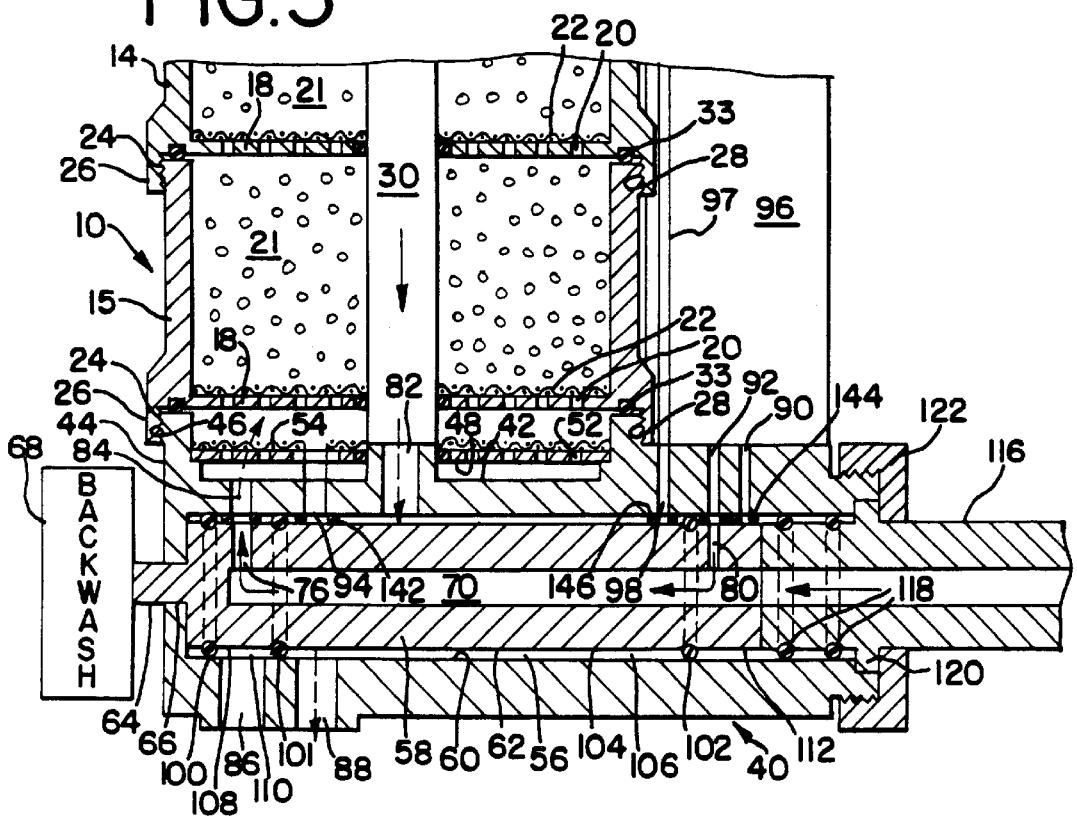

US 6,398,954 B2

MULTIMEDIA BACKWASHABLE FILTRATION SYSTEM

This application is a division of application Ser. No. 09/025,231, filed Feb. 18, 1998 now U.S. Pat. No. 6,254,772, which application is a continuation-in-part of application Ser. No. 09/007,497, filed Jan. 15, 1998 abandoned.

BACKGROUND AND SUMMARY OF INVENTION

The present invention is directed to a multimedia backwashable filter system and, more particularly, to a multimedia water treatment unit and rotatable control valve therefor.

Multimedia fluid treatment systems have been employed in the past for the treatment of various fluids, such as water. In these systems, various different treatment media have been employed in serial relationship to each other so that for example one medium may have a beneficial effect on subsequent downstream media. For example, in Heskett U.S. Pat. No. 5,415,770 it is disclosed that the use of certain finely divided metals, such as alloys of copper and zinc, may be employed as an upstream treatment medium to remove certain chemical constituents, such as residual chlorine, prior to subjecting water to other downstream water treatment media, such as activated carbon and/or an ion exchange medium. By removing the chlorine, the function and life of the latter two media may be improved and extended.

In such prior systems the several respective media are frequently located in several distinct units which are physically separated from each other and the fluids are passed through these distinct units in a serial fashion. These individual units can be individually serviced but they are demanding of space and material. Where the several respective media are contained in a single container or tank, they are difficult to maintain separate from each other, particularly due to the wide disparity in weights and/or sizes of media particles. Even where they can be maintained separate from each other, the placement of each of the media in the same tank makes it physically difficult to service or replace one medium without replacing the others due to their positioning relative to each other. Another disadvantage, particularly in small countertop water treatment units, is that no provision is currently known to permit rinsing or backwashing of the media which, if possible, might greatly extend the life of the system and their respective media.

It is the purpose of the present invention to avoid and eliminate the aforementioned disadvantages. In the present invention, a multimedia fluid treatment unit with an efficient rotatable control valve is provided which is compact, permits ready servicing of the unit and the utilization of a number of different media in the unit, and which prolongs the life of the unit by selective arrangement of the several media relative to each other to remove compounds which might be harmful to some of the media and by permitting rinsing and backwashing of the several media. Moreover, in the present invention a plurality of media containing containers are provided which are removably fixed to each other to facilitate replacement and service.

In one principal aspect of the present invention, a multimedia fluid treatment unit comprises a plurality of discrete containers stacked upon each other. Each of the discrete containers has an inlet for fluid at one location thereon and a discharge for fluid opposite the inlet. Each container is positioned in series flow relationship to the next adjacent container, and each of the containers defines a chamber for receiving and retaining a finely divided fluid treatment medium therein and between the fluid inlet and discharge whereby the fluid to be treated will flow through the medium in each chamber and serially to the medium in the next chamber. A valve is associated with the containers and is operable to a first service position in which the fluid to be treated is introduced to the containers and the fluid which is treated by the media in the containers is removed from the containers and discharged, to a second rinse position in which the treatment medium in the chambers is rinsed, and to a third backwash position in which the treatment medium in the chambers is backwashed.

In another principal aspect of the present invention, each of the containers includes a floor which includes perforations therein to form the discharge and contain the medium in the chamber of the container.

In still another principal aspect of the present invention, a mesh material is supported on the floor to contain the medium in the chamber of the container.

In still another principal aspect of the present invention, each of the containers is removably attached to its next adjacent container.

In still another principal aspect of the present invention, the fluid treatment medium is a water treatment medium which may be two or more of finely divided metals or alloys thereof, activated carbon, inert particulates and/or ion exchange media.

In still another principal aspect of the present invention, a housing has an elongate cylindrical chamber therein, and first, second, third and fourth passages extending through the housing and communicating with the cylindrical chamber. A valve includes a cylindrical valve body mounted for rotation in the cylindrical chamber, and the valve body has an axially extending passage therein which communicates with a source of fluid supply for the valve. The valve body has a first area adjacent its cylindrical surface which is aligned with the first and fourth passages, and a second area also adjacent its cylindrical surface which is aligned with the second and third passages. The valve body also includes first and second ports communicating between the axially extending passage and the first area, and a third port communicating between the axially extending passage and the second area. The cylindrical valve body is selectively rotatable between the first service position in which the first port communicates with the first passage and the second passage communicates with the third passage, the second rinse position in which the second port communicates with the first passage, and the third backwash position in which the third port communicates with the second passage and the first passage communicates with the fourth passage.

In still another principal aspect of the present invention, the aforementioned housing includes fifth and sixth passages extending through the housing and communicating with the cylindrical chamber, and the cylindrical valve body has a third area adjacent its surface which is aligned with the fifth and sixth passages, and fourth and fifth ports communicating between the axially extending passage and the third area. The fifth passage communicates with the fourth port when the cylindrical valve body has been rotated to the second rinse position, and the sixth passage communicates with the fifth port when the cylindrical valve body has been rotated to the third backwash position.

In still another principal aspect of the present invention, the aforementioned housing includes a seventh passage extending through the housing and communicating with the first area, and the first area is aligned with the seventh passage so that the seventh passage communicates with the fourth passage when the cylindrical valve body has been rotated to the second rinse position.

In still another principal aspect of the present invention, the multimedia fluid treatment unit includes sediment retaining means adjacent the discharge of the most downstream container when the valve is in the first service position for retaining fine particles which may have passed through the chambers of the containers during the treatment of the fluid. The aforementioned seventh passage communicates with the fourth passage to discharge such fine particles from the sediment retaining means when the valve is positioned in the second rinse position.

In still another principal aspect of the present invention, the multimedia fluid treatment unit includes at least one fluid treatment medium which is an ion exchange medium and a container for the production and containment of a fluid composition for the regeneration of the ion exchange medium. The fifth and sixth passages communicate with the last mentioned container to introduce fluid to and discharge fluid from the container.

In still another principal aspect of the present invention, the aforementioned seventh passage defines an overflow for the container for the composition and communicates with the first area, the first area is aligned with the seventh passage, and the seventh passage communicates with the fourth passage when the cylindrical valve body has been rotated to the second rinse position.

In still another principal aspect of the present invention, the aforementioned second passage is sealed when the cylindrical valve body is rotated to the second rinse position, the fifth and sixth passages are sealed when the cylindrical valve body is rotated to the first service position, the sixth passage is sealed when the cylindrical valve body is rotated to the second rinse position, the fifth passage is sealed when the cylindrical valve body is rotated to the third backwash position, and the aforementioned seventh passage is sealed when the cylinder is rotated to the first and third positions.

In still another principal aspect of the present invention, the aforementioned sealing is by a seal on the surface of the valve body in the second area which aligns with the second passage when the valve body is rotated, by seals on the surface of the valve body in the third area which align with the fifth and sixth passages when the valve body is rotated, and by a seal on the surface of the valve body in the first area which aligns with the seventh passage when the valve body is rotated.

In still another principal aspect of the present invention, the surface of the cylindrical valve body in the first and second areas is spaced from the surface of the chamber in the housing to define an annular passage between the surfaces, and the first, second and third areas are divided from each other to define first and second annular passages at the first and second areas respectively.

In still another principal aspect of the present invention, the first, second and third areas are divided from each other by O-rings about the cylindrical valve body to define the first and second annular passages.

In still another principal aspect of the present invention, the cylindrical valve body comprises a single cylinder.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 2 is a broken, cross-sectioned elevation view of the unit and valve shown in FIG. 1, but with the valve positioned in the rinse position;

FIG. 3 is a broken, cross-sectioned elevation view of the unit and valve shown in FIG. 1, but with the valve shown in the backwash position.

DESCRIPTION OF THE PREFERRED EMBODIMENT

Figure 1:
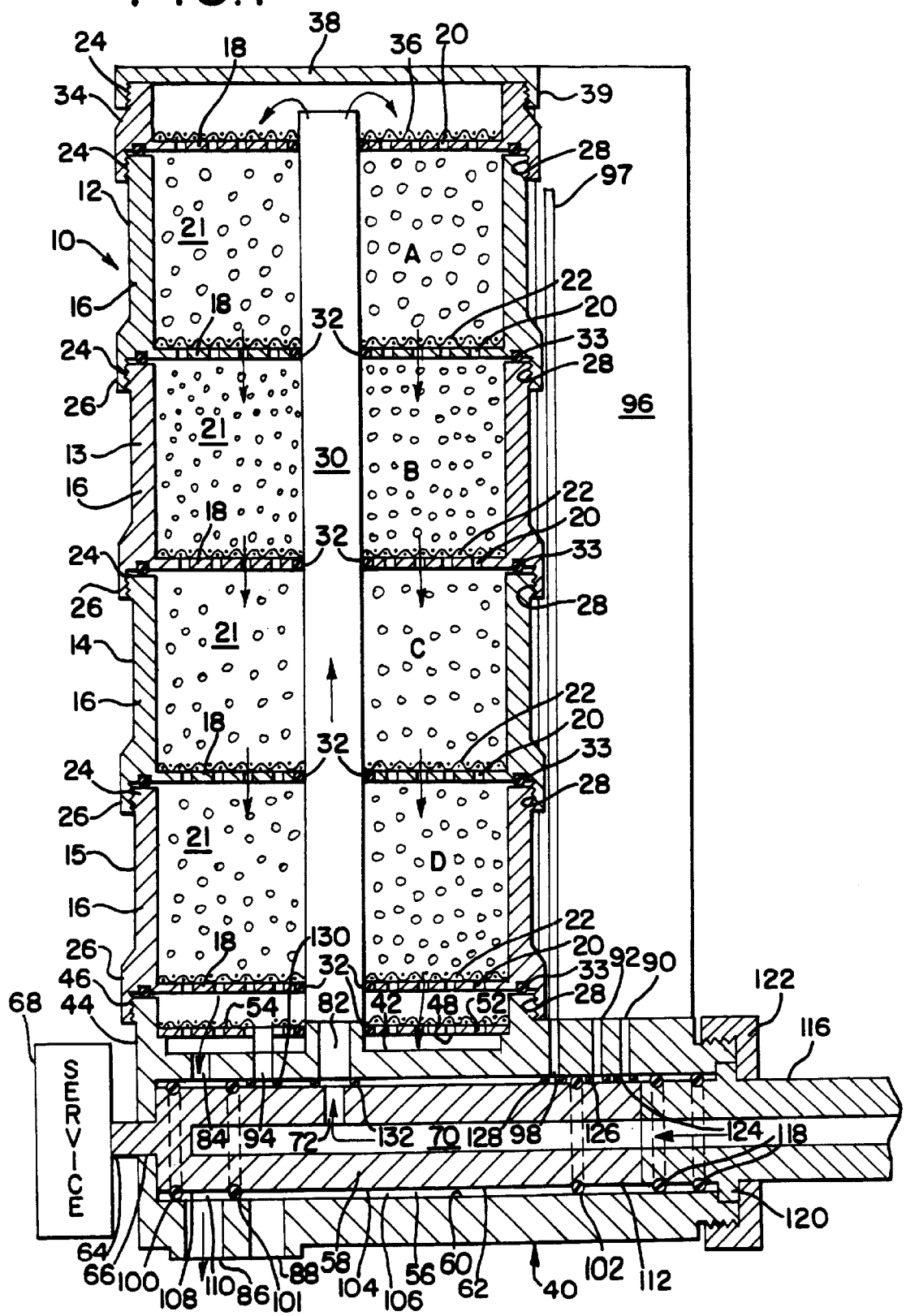
FIG. 1 is an overall, partially broken, cross-sectioned elevation view of a preferred embodiment of multimedia fluid treatment unit and rotatable valve incorporating the principles of the present invention and with the valve positioned in the service position.

A multimedia fluid treatment unit 10 is shown in FIGS. 1–3. In a preferred application, the unit 10 may be a countertop or under the counter unit for the treatment of municipal or other potable water supply. The unit 10 preferably comprises a plurality of containers 12, 13, 14 and 15 as shown in FIG. 1. In order to simplify inventory considerations, each of the containers 12, 13, 14 and 15 is preferably identical in design, and therefore, in the description to follow like or similar container components will be assigned like reference numerals.

Each container comprises a vertical sidewall 16 and a floor 18 having perforations 20 for the discharge of treated water from the respective containers, as shown by the arrows in FIG. 1. The sidewall 16 and floor 18 of each of the containers define a chamber 21 in each for containing water treatment media as will be described more fully below. The floor 18 of each container preferably functions as support for a mesh or fiber material 22 which has a pore size which is small enough to contain the water treating medium in each of the respective container chambers 21, but large enough to permit the water to pass through the mesh and be discharged from each respective container. By way of example, the mesh size of the mesh 22 may be about 10 microns. Each of the containers 12, 13, 14 and 15 also includes threads 24 at their top and a downwardly extending flange 26 at their bottom having internal threads 28 which are adapted to thread onto the threads 24 at the top of the next lower container to readily permit assembly of the containers in serial relationship to each other, as seen in FIG. 1, and also disassembly when desired for example for servicing or replacement.

In the preferred embodiment as shown in the drawings, the unit 10 also includes a riser conduit 30 upon which the respective containers are assembled, with the floor 18 of each container having an opening to receive the riser and an O-ring 32 to prevent undesirable leakage between the respective containers at the riser 30. An O-ring 33 is also provided between the sidewalls 16 of each of the respective containers to seal them against leakage to their exterior.

The unit 10 is preferably capped by top piece 34, which may for example be a shortened version of the containers 12, 13, 14 and 15. The top piece 34 provides sufficient space for the water to be treated to be discharged at the top of the riser 30, as shown by the arrows in FIG. 1, and to flow down through the respective containers for treatment. Like the containers 12, 13, 14 and 15, the top piece 34 also preferably includes a floor 18 having perforations 20 which supports a mesh 36 thereon. The mesh 36 is preferably of finer mesh than the mesh 22 on the floors 18 of the containers, and is for example 0.5 micron. The mesh 36 is finer because it has the purpose of retaining any fine contaminate particles which might enter with the water to be treated. The top piece 34 also preferably includes threads 24 for receiving a closure cap 38 having a downwardly extending flange 39 which is threaded onto the threads 24 of the uppermost container 12, also as seen in FIG. 1. Thus, it will be seen that the mesh 36 is accessible for servicing and replacement simply by removal of the closure cap 38 if desired.

The unit 10 of the preferred embodiment of invention also includes a valve housing 40 having an upwardly facing well 42 defined by an upwardly extending flange 44 having threads 46 at its top for receiving and attaching the threaded flange 26 of the bottommost container 15.

The chamber 21 in each of the respective containers 12, 13, 14 and 15 in the unit 10 preferably contains different fluid treatment media. For example where the unit is to be utilized to treat water, the water treatment medium A in the chamber 31 of container 12 may be a particulate filter material, such as sand. The water treatment medium B in container 13 may be a finely divided metal, such as disclosed in the previously mentioned U.S. Pat. No. 5,415,770. The water treatment medium C in container 14 may be some sort of ion exchange resin for the removal of undesirable ions such as a cationic resin for the removal of hardness, or an anionic resin for the removal of undesirable nitrates or organics. The water treatment medium D in container 15 may be activated carbon. Because each of the containers are removably attached to each other, servicing and replacement of the respective media are facilitated. Moreover, in the arrangement of the media described, the particulate or finely divided metal medium B can actually prolong the life of an ion exchange medium C and/or activated carbon medium D by removing residual chlorine from the water which may have a deleterious effect on either of the latter two media.

Figure 4:
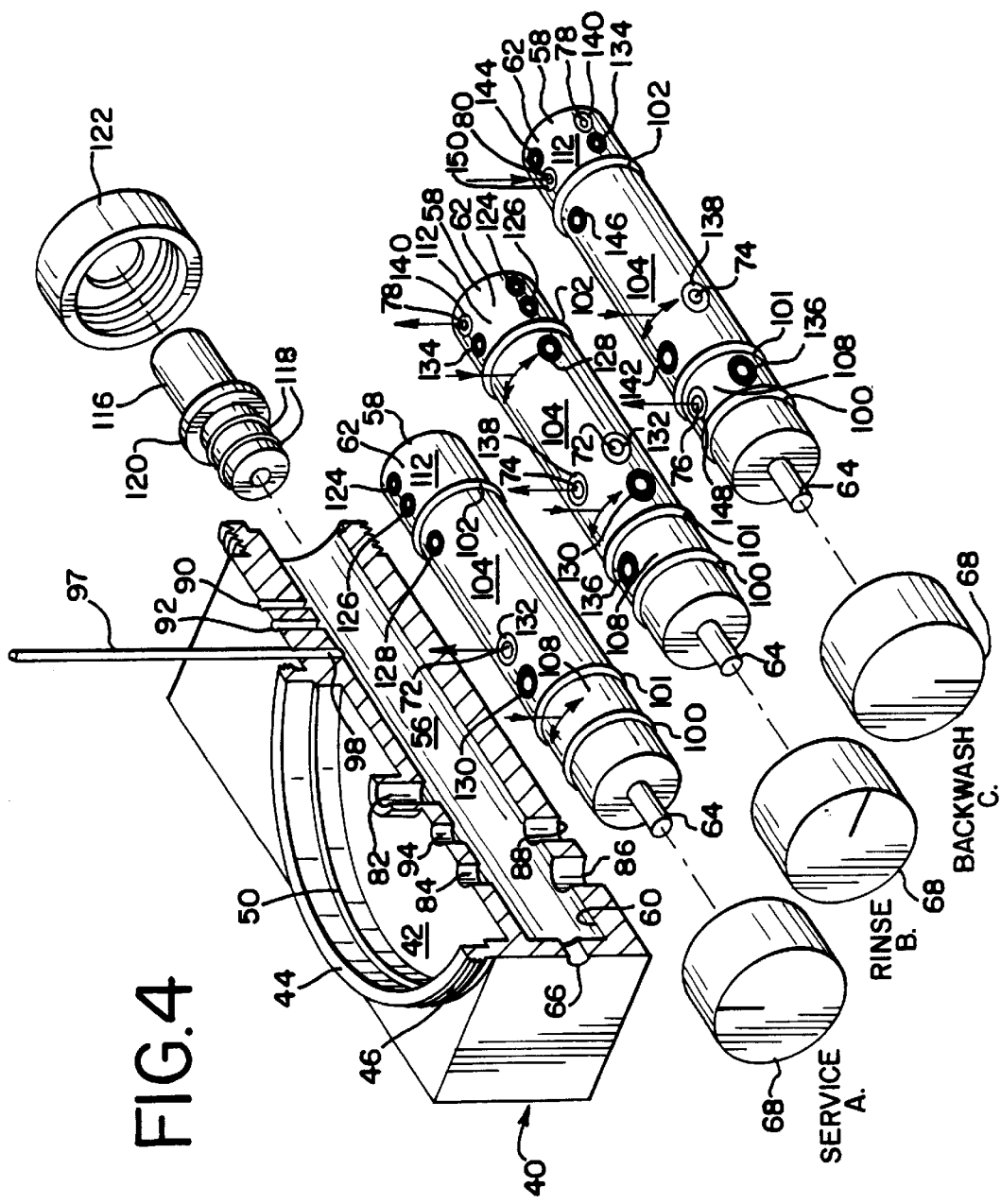
FIG. 4 is an exploded perspective view of a preferred embodiment of valve housing and valve of the present invention and showing the valve components in their service position in FIG. 4A, their rinse position in FIG. 4B and their backwash position in FIG. 4C.

A floor plate 48 is also preferably positioned in the well 42 intermediate of the depth of the well 42. As best seen in FIG. 4, the floor plate 48 may rest on a shoulder 50 in the well. The floor plate 48 also preferably includes an O-ring 32 to seal against leakage between it and the riser. The floor plate 48 provides a support for a very fine mesh 54 on the top of the floor plate, and has perforations 52 to permit the passage of water therethrough, as shown by the arrows in FIGS. 1 and 3. The mesh 54 is preferably fine and on the order of 0.5 micron and has the purpose of retaining any extremely small fines that may be able to make their way through the respective media or may constitute the smallest of the particle sizes of the media which are able to find their way through the coarser meshes 22. These extremely small fines will be retained on the fine mesh 54 until flushed from the system during the rinse cycle to be described below.

The housing 40 also includes an elongate cylindrical chamber 56 which opens to one side of the housing and extends through most of the width of the housing. A cylindrical valve body 58 is positioned in the chamber 56. The diameter of the valve body 58 is somewhat less than the diameter of the chamber 56, as seen in FIGS. 1–3, so that the surface 60 of the cylindrical chamber 56 will be spaced somewhat from the surface 62 of the valve body to provide an annular clearance for fluid flow and seals as will be described below.

A shaft 64 extends from the end of the valve body 58 through an opening 66 in the housing 40 and a control knob 68 is mounted on the shaft 64 for rotation of the valve body to its various operative positions as will also be described below.

An axially extending passage 70 extends from the end of the valve body opposite the shaft 64 to well within the valve body and adjacent the shaft 64, as best seen in FIGS. 1–3. A plurality of various ports extend radially from the axial passage 70 and outwardly through the valve body surface 60. These ports include a first port 72, as best seen in FIGS. 1, 4A and 4B, a second port 74 as best seen in FIGS. 2, 4B and 4C, a third port 76 as best seen in FIGS. 3 and 4C, a fourth port 78 as best seen in FIGS. 2, 4B and 4C, and a fifth port 80 as best seen FIGS. 3 and 4C.

The housing 40 also includes a plurality of passages at least some of which communicate with some of the aforementioned ports, depending upon the position to which the valve body 58 has been rotated. These passages include a first passage 82, a second passage 84, a third passage 86, a fourth passage 88, a fifth passage 90 and a sixth passage 92. A passage 94 in the housing 40 also communicates with the well 42 and upstream side of the mesh 54 for the discharge during the rinse cycle of any fines that may have accumulated on the mesh. Where the fluid treatment unit includes as one of its treatment media an ion exchange medium resin as a water treatment medium as previously described, it is preferred that the unit also include a container 96 for the production and containment of a brine regeneration composition, such as sodium or potassium chloride, for the regeneration of the ion exchange medium. The fifth and sixth passages 90 and 92 preferably communicate with the container 96 to introduce water to the container to produce the brine and to discharge the brine from the container during backwash and regeneration. An overflow conduit 97 is preferably provided in the container 96 and communicates with still another passage 98 through the housing 40 to discharge any excess brine solution.

Several O-rings 100, 101 and 102 also preferably encircle the valve body 58 and are spaced from each other along the length of the valve body as seen in the drawings. O-rings 101 and 102 separate the overall cylindrical surface 62 of the valve body 58 into a first area 104 which, due to the spacing of the valve body surfaces 62 from the chamber surface 60, defines a first annular passage 106 between the chamber surface 60 and valve body 58 as seen in FIGS. 1–3. The O-rings 100 and 101 define a second area 108 on the surface 62 of the valve body 58, which second area also defines a second annular passage 110 about the valve body, as seen in FIGS. 1–3. O-ring 102 also defines a third area 112 on the surface 62 of the valve body 58.

The valve assembly also preferably includes a nipple 116 for coupling to a source of water supply (not shown) to communicate the water to be treated to the axial passage 70 in the valve body 58, as shown in the drawings. The nipple 116 preferably includes one or more O-rings 118 on the end of the nipple which is positioned in the housing cylindrical chamber 56 to seal the nipple against leakage. The nipple 116 may also include a conventional annular flange 120 which is adapted to seat against the end of the housing 40 and be held there by a threaded cap 122.

A number of blind seals are also positioned on the cylindrical surface 62 of the valve body 58 at various locations and in various ones of its areas as best seen in FIG. 4. These blind seals are shown in FIG. 4 in solid black, and they are termed "blind" because they do not communicate with any port in the valve body. This is in contrast to "port" seals which are shown in outline only in FIG. 4 of the drawing and which surround various of the previously identified ports through the valve body 58.

Referring to FIGS. 1 and 4A in which the valve body 58 is shown in its service position, blind seals are shown in blocking arrangement with passages as follows: blind seal 124 in the third area 112 of the valve body blocks the fifth passage 90, blind seal 126 also in the third area 112 blocks the sixth passage 92, blind seal 128 in the first area 104 of the valve body blocks the passage 98 from the overflow conduit 97 in container 96, and blind seal 130 also in the first area 104 blocks the passage 94, while port seal 132 in the first area 104 is in alignment with the first passage 82 to communicate it with port 72. Thus, when the valve body 58 is in its service position as shown in FIGS. 1 and 4A, water will be communicated from the nipple 116 through passage 70, port 72, port seal 132 and the first passage 82 upwardly through the riser 30. The water is discharged from the top of the riser onto the fine mesh 36 which will retain undesirable particulate contaminates. The water will then pass through the mesh 36, the perforations 20 and the floor 18 of the top piece 34, and will flow serially down through the media A, B, C, D in the chambers 21 of the respective containers 12, 13, 14 and 15. The treated water will continue to flow downwardly through the mesh 54 which will retain any super fine particulates, the perforations 52 in the floor plate 48, through the second passage 84, around the valve body 58 in its second area 108 and second annular passage 110, and out through the third discharge passage 86 to service. In this service position of the valve body 58, flow will be blocked through the fifth passage 90 by blind seal 124, the sixth passage 92 by blind seal 126, the passage 98 by blind seal 128 and the passage 94 by blind seal 130.

Referring to FIGS. 2 and 4B, when it is desired to shift the operation of the unit from the service mode to the rinse mode, the valve body 58 is rotated 90° to the rinse position, as shown in FIG. 4B. This will rotate a blind seal 134 in the third area 112 into blocking relationship with the sixth passage 92 from the container 96, and a blind seal 136 in the second area 108 into blocking relationship with the second passage 84 from the multimedia fluid treatment unit. This 90° rotation to the rinse position also rotates blind seal 128 in the first area 104 out of blocking relationship to the passage 98 from the overflow conduit 97, which permits it to communicate via the first annular passage 106 around the valve body to the fourth drain passage 88 to discharge any overflow from the container 96 to drain. The blind seal 130 in the first area 104 is also rotated out of blocking relationship to the passage 94 which permits flushing of the mesh 54 through passage 94 and through the first annular passage 106 around the valve body to the drain 88 to remove any fines which may have collected on the mesh 54. Rotation of the valve body 58 to the rinse position as shown in FIGS. 2 and 4B also aligns port seal 138 in the first area 104 with the first passage 82 to permit rinse water to pass from the passage 70 through the second port 74, the first passage 82 and the riser 30 to flush the media A, B, C and D as shown by the arrows in FIG. 2. Rotation of the valve body to the rinse position shown in FIGS. 2 and 4B also aligns the port seal 140 in the third area 112 with the fifth passage 90 to introduce water through the port 78 and passage 90 to the container 96 to produce liquid to regenerate an ion exchange medium which may be in the unit.

Referring now to FIGS. 3 and 4C, when it is desired to shift the operation of the unit to backwash and regenerate the media, the valve body 58 is rotated an additional 90° from the rinse position or 180° from the service position. In this backwash position, a blind seal 142 in the first area 104 will be rotated into sealing relationship with the passage 94, a blind seal 144 in the third area 112 will be rotated into sealing relationship with the fifth passage 90, and a blind seal 146 in the first area 104 will be rotated into sealing relationship with the passage 98 from the overflow 97 of the container 96. At the same time, a port seal 148 in the second area 108 will be rotated into alignment with the second passage 84 to communicate passage 70 and the third port 76 with the passage 84 and the bottom side of the respective water treating media to backflush the media in the reverse direction. Port seal 150 will also be aligned with the sixth passage 92 to discharge the regenerating fluid from the container 96 to passage 92 and the fifth port 80 through the passage 70 and to the bottom side of the water treating media. Finally, in this backwash position, port seal 138 will also be rotated out of alignment with the first port 82 so that the backflushing liquid which has passed upwardly through the media D, C, B and A in that order, will pass downwardly through the riser 30, through the passage 82 into the first annular passage 106 around the valve body, and out through the fourth drain passage 88.

From the foregoing, it will be appreciated that the servicing of the units of the present invention is greatly facilitated and their life substantially prolonged both by virtue of the beneficial effect of the various media on each other, e.g. removal of detrimental chlorine from the incoming water which might otherwise shorten the life of an ion exchange medium and/or activated carbon. Life of the unit and the media without servicing is also substantially extended by the ability to be able to rinse, backwash and regenerate the media rather than merely discarding it when it has completed its first service cycle.

It will be appreciated that although the embodiment of the unit is shown in the drawings with a riser 30, the riser may be eliminated as well as the openings through the floors of the respective containers which accommodate the riser, and the containers may themselves be placed in a housing which may be flooded in lieu of the riser.

It will also be appreciated that although the valve body is described as rotated 90° between its several positions, the actual number of degrees of rotation is not critical to the invention.

It will also be understood that the preferred embodiments of the present invention which have been described are merely illustrative of the principles of the present invention. Numerous modifications may be made by those skilled in the art without departing from the true spirit and scope of the invention.

I claim:

1. A rotatable valve comprising:

a housing having an elongate cylindrical chamber therein;

first, second, third and fourth passages extending through said housing and communicating with said chamber;

a cylindrical valve body mounted for rotation in said chamber, said valve body having an axially extending passage therein, said axially extending passage communicating with a source of fluid supply for the valve, said valve body having a first area adjacent its cylindrical surface which is aligned with said first and fourth passages, and a second area also adjacent its cylindrical surface which is aligned with said second and third passages, said valve body also including first and second ports communicating between said axially extending passage and said first area and a third port communicating between said axially extending passage and said second area;

said cylindrical valve body being selectively rotatable between either of at least three positions including, a first position in which said first port communicates with said first passage and said second passage communicates with said third passage, a second position in which said second port communicates with said first passage, and a third position in which said third port communicates with said second passage and said first passage communicates with said fourth passage.

2. The rotatable valve of claim 1, wherein said second passage is sealed when said cylindrical valve body is rotated to said second position.

3. The rotatable valve of claim 2, wherein the sealing is by a seal on the surface of said valve body in said second area which aligns with said second passage when said valve body is rotated.

4. The rotatable valve of claim 1, wherein the surface of the cylindrical valve body in said first and second areas is spaced from the surface of said chamber to define an annular passage between said surfaces, and said first and second areas are divided from each other to define first and second annular passages at said first and second areas respectively.

5. The rotatable valve of claim 4, wherein said first and second areas are divided from each other by an O-ring about said cylindrical valve body to define said first and second annular passages.

6. The rotatable valve of claim 1, wherein said cylindrical valve body comprises a single cylinder.

7. The rotatable valve of claim 1, including fifth and sixth passages extending thorough said housing and communicating with said chamber;

said cylindrical valve body having a third area adjacent its surface which is aligned with said fifth and sixth passages, and fourth and fifth ports communicating between said axially extending passage and said third area; and wherein said fifth passage communicates with said fourth port when said cylindrical valve body has been rotated to said second position, and said sixth passage communicates with said fifth port when said cylindrical valve body has been rotated to said third position.

8. The rotatable valve of claim 7, wherein said fifth and sixth passages are sealed when said cylindrical valve body is rotated to said first position, said sixth passage is sealed when said cylindrical valve body is rotated to said second position, and said fifth passage is sealed when said cylindrical valve body is rotated to said third position.

9. The rotatable valve of claim 8, wherein the sealing is by seals on the surface of said valve body in said third area which align with said fifth and sixth passages when said valve body is rotated.

10. The rotatable valve of claim 7, wherein the surface of the cylindrical valve body in said third area is also spaced from the surface of said chamber, and said first, second and third areas are divided from each other to define first and second annular passages at said first and second areas, respectively.

11. The rotatable valve of claim 10, wherein said first, second and third areas are divided from each other by O-rings about said cylindrical valve body to define said first and second annular passages.

12. The rotatable valve of claim 7, including a seventh passage extending through said housing and communicating with said first area, said first area being aligned with said seventh passage; and wherein said seventh passage communicates with said fourth passage when said cylindrical valve body has been rotated to said second position.

13. The rotatable valve of claim 12, wherein said seventh passage is sealed when said cylinder is rotated to said first and third positions.

14. The rotatable valve of claim 13, wherein the sealing is by a seal on the surface of said valve body in said first area which aligns with said seventh passage when said valve body is rotated.

15. The rotatable valve of claim 1, including in combination therewith a unit containing at least one fluid treatment medium, said first and second passages communicating with said medium, said third passage comprising a discharge for fluid which has been treated by the medium, and said fourth passage comprising a drain, and wherein said first position comprises a service position in which the fluid is treated in the unit by the medium, said second position comprises a rinse position in which the treatment medium is rinsed, and said third position comprises a backwash position in which the treatment medium is backwashed.

16. The rotatable valve of claim 15, wherein said treatment medium includes an ion exchange medium, and said backwash position regenerates said ion exchange medium.

* * * * *